(12) United States Patent
Dimitri et al.

(10) Patent No.: US 6,512,962 B2
(45) Date of Patent: Jan. 28, 2003

(54) CABLING PICKER IN A LIBRARY OF STATIONARY MEMORY DEVICES

(75) Inventors: Kamal Dimitri, Tucson, AZ (US); John E. Kulakowski, Tucson, AZ (US); Rod J. Means, Tucson, AZ (US); Jesse L. Thrall, Tucson, AZ (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 26 days.

(21) Appl. No.: 09/844,128

(22) Filed: Apr. 26, 2001

(65) Prior Publication Data

US 2002/0161474 A1 Oct. 31, 2002

(51) Int. Cl.$^7$ ................................................ G06F 7/00
(52) U.S. Cl. ..................... 700/214; 700/255; 360/92
(58) Field of Search ................... 700/213, 214, 700/218, 245, 255; 360/69, 71, 92

(56) References Cited

U.S. PATENT DOCUMENTS

| | | | |
|---|---|---|---|
| 4,761,785 A | 8/1988 | Clark et al. | |
| 4,864,511 A | 9/1989 | Moy et al. | |
| 5,123,000 A | 6/1992 | Fitzgerald et al. | |
| 5,197,055 A | 3/1993 | Hartung et al. | |
| 5,289,589 A | 2/1994 | Bingham et al. | |
| 5,377,121 A | 12/1994 | Dimitri et al. | |
| 5,423,046 A | 6/1995 | Nunnelley et al. | |
| 5,638,347 A | 6/1997 | Baca et al. | |
| 5,875,063 A | 2/1999 | Corrington et al. | |
| 5,915,081 A | 6/1999 | Yamamoto et al. | |
| 5,970,030 A | 10/1999 | Dimitri et al. | |
| 5,983,357 A | 11/1999 | Sun | |
| 6,005,745 A | 12/1999 | Filkins et al. | |
| 6,022,180 A | 2/2000 | Motoyama et al. | |
| 6,052,341 A | * 4/2000 | Bingham et al. | ........... 700/214 |
| 6,356,803 B1 | * 3/2002 | Goodman et al. | ........... 700/214 |

\* cited by examiner

*Primary Examiner*—Khoi H. Tran
(74) *Attorney, Agent, or Firm*—Garth E. Janke; Birdwell Janke & Durando, PLC

(57) ABSTRACT

Disclosed is a cabling picker in a library of stationary memory devices. One or more input/output cables electrically connected to a host computer through a destination are provided, and these are moved or manipulated for interconnecting with selected memory devices in the library instead of moving the memory devices to the destination.

42 Claims, 3 Drawing Sheets

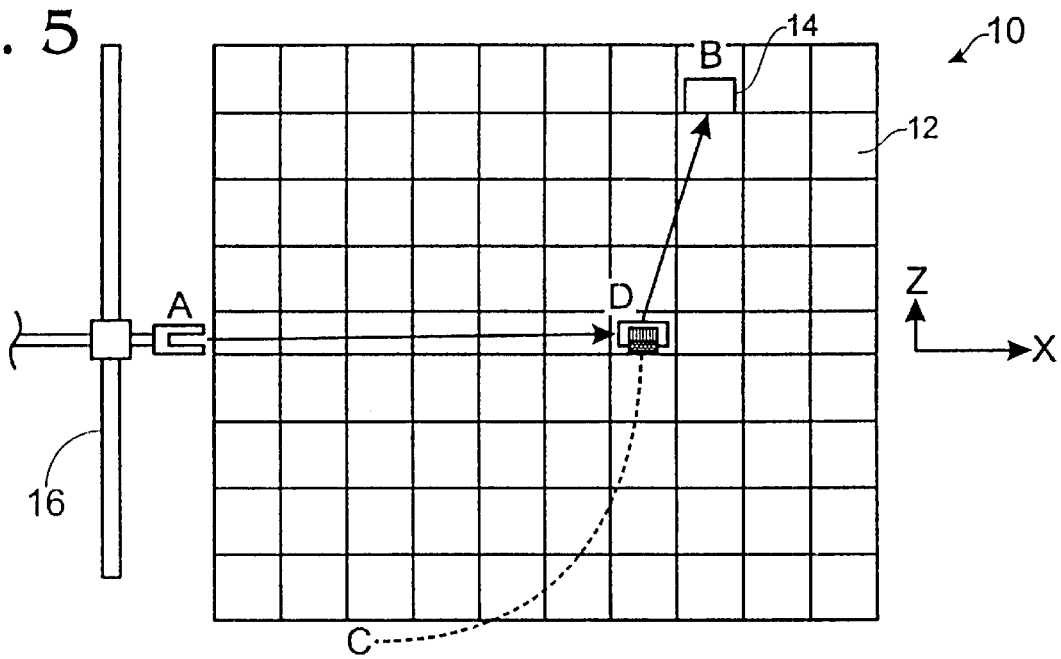
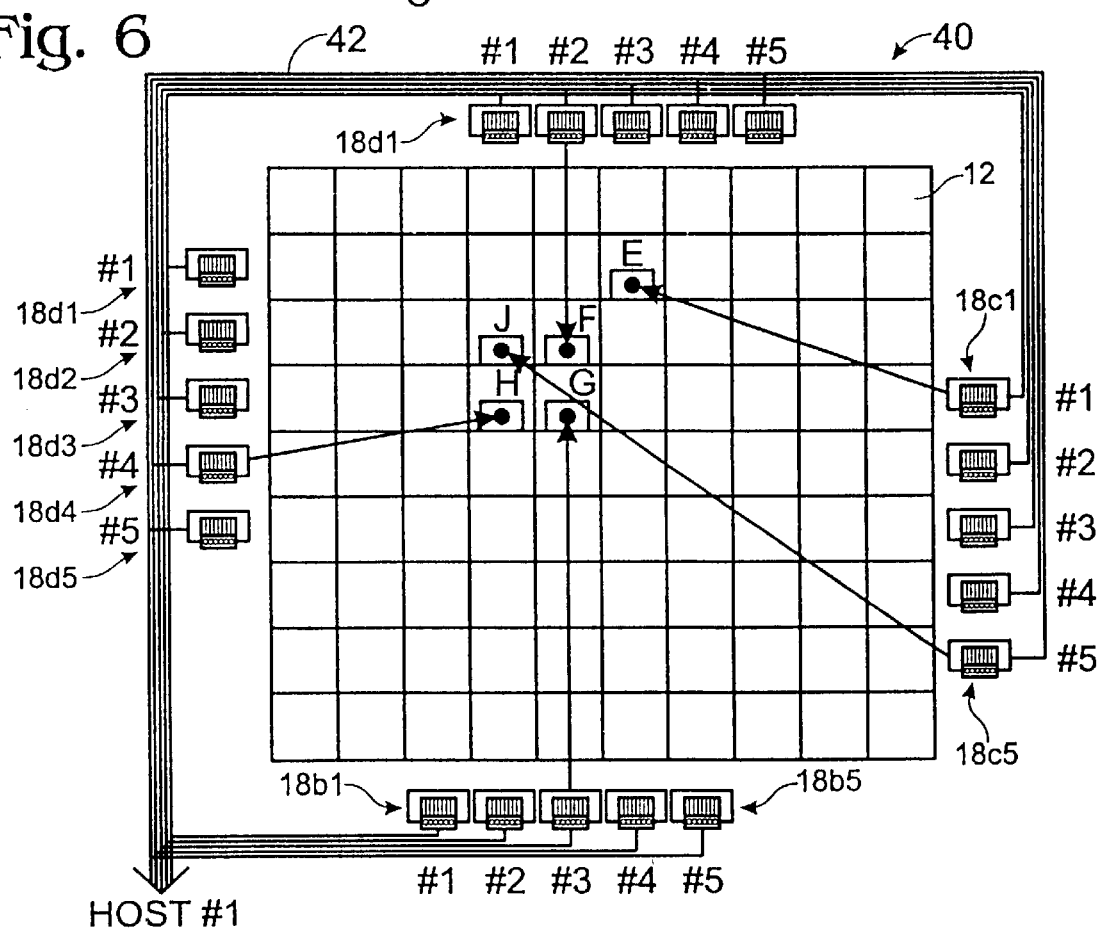

CABLING PICKER IN A LIBRARY OF STATIONARY MEMORY DEVICES

TECHNICAL FIELD

The present invention relates to a method and apparatus for interconnecting a computer with selected memory devices in a library of memory devices.

BACKGROUND OF THE INVENTION

Large scale computing devices often employ a library of removable computer memory media to provide for increased storage capability and the sharing of media by multiple hosts. In such a library, the media are shelved in storage bins for retrieval by a robotic picking apparatus or "picker." Such a picker for optical disk media is described in Dimitri et al., U.S. Pat. No. 5,377,121, which is herein incorporated by reference in its entirety. Tape cassettes are another common library media. The library has at least one drive receptacle coupled to one or more host computers that may read or write to the media.

When a host requests a particular medium in the library, the picker is typically commanded to travel to the storage bin in the library where the medium is shelved, grip the medium, remove the medium from the storage bin, travel to a destination drive having input/output ("I/O") connections with the host, insert the medium into the drive, and power the drive.

A problem with these prior art libraries is that optical media provides relatively slow reading and writing, while tape media provides relatively slow random access.

In recognition of these problems, the concept of a library of hard disk drives was developed, which is the subject of the assignee's companion application entitled LIBRARY OF HARD DISK DRIVES WITH TRANSPARENT EMULATING INTERFACE, executed on Apr. 19, 2001 by inventors Kamal Dimitri, Robert G. Emberty, Craig Klein, and Daniel J. Winarski, filed on Apr. 26, 2001, and incorporated herein by reference in its entirety. According to the concept, hard disk drives are stored in associated storage locations in the library. The robotic picker is adapted to couple and decouple a selected disk drive from a destination receptacle that is coupled to the one or more host computers requesting data.

The hard disk drive library provides the advantage of relative speed as compared to libraries employing optical or tape media. Entire hard disk drives, rather than hard disk media, are exchanged in the library to remain within the close mechanical tolerances required for efficient use of this memory element.

In a basic form of the concept, the destination receptacle provides power connections to the disk drive and I/O connections to the host computers, and the robotic picker retrieves the selected disk drive from its storage location, carries the disk drive to and inserts the disk drive into the destination receptacle. The disk drive is then powered and spins up to its operating speed. Finally, when this operating speed is reached, the data on the disk drive may be accessed by the computer.

As may be readily appreciated, the movements required for accessing either media or drives in the library takes time, and efforts are constantly being made to decrease the time required.

Accordingly, there is a need for a cabling picker in a library of stationary memory devices that provides for decreasing the time and cost required to match a host computer with a selected memory device in the library.

SUMMARY OF THE INVENTION

Disclosed is a cabling picker in a library of stationary memory devices. One or more input/output cables electrically connected to a host computer through a destination are provided, and these are moved or manipulated for interconnecting with selected memory devices in the library instead of moving the memory devices to the destination.

Therefore, it is a principal object of the present invention to provide a novel cabling picker in a library of stationary memory devices.

It is another object of the present invention to provide a cabling picker in a library of stationary memory devices that provides for increasing the speed with which a selected memory device in the library may be connected to a host computer.

It is yet another object of the present invention to provide a cabling picker in a library of stationary memory devices that provides for decreasing the cost of the apparatus employed for connecting a selected memory device in the library to a host computer.

The foregoing and other objects, features and advantages of the present invention will be more readily understood upon consideration of the following detailed description of the invention, taken in conjunction with the following drawings.

BRIEF DESCRIPTION OF THE DRAWINGS

FIG. 5 is a pictorial schematic illustrating a distance of travel for a cabling picker according to the present invention.

FIG. 6 is a pictorial schematic illustrating yet another embodiment of a method for using a cabling picker according to the present invention.

DETAILED DESCRIPTION OF A PREFERRED EMBODIMENT

Figure 1:
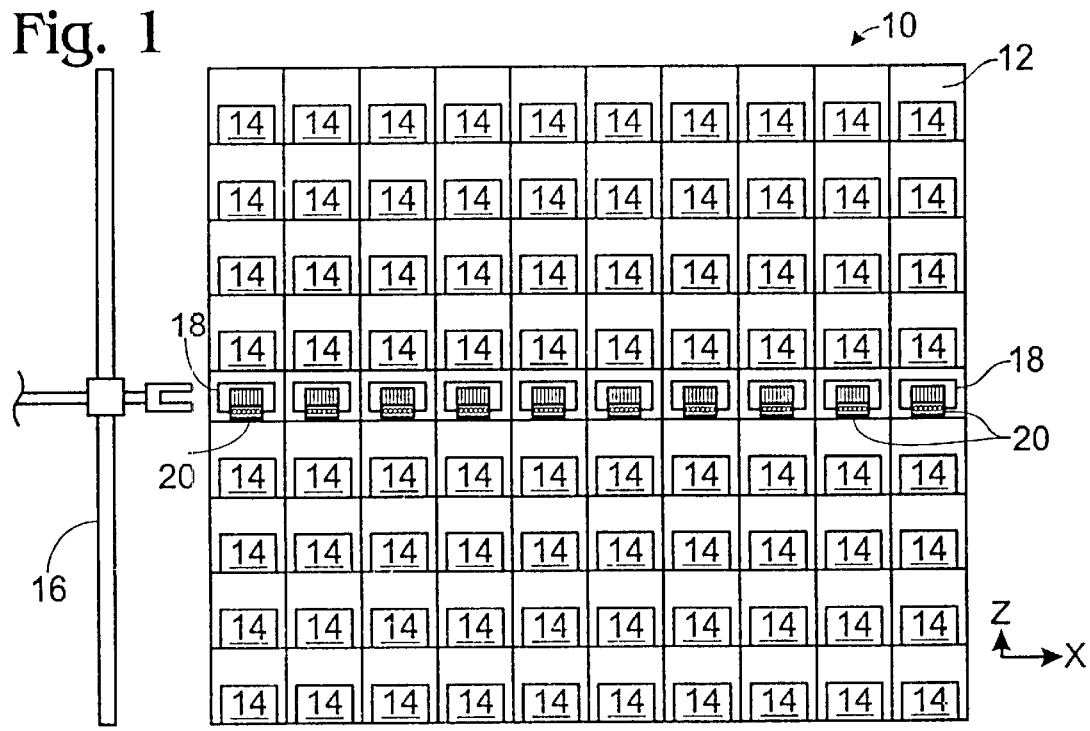
FIG. 1 is a pictorial schematic illustrating a cabling picker in a library of stationary memory devices according to the present invention.

Referring to FIG. 1, a library 10 is shown for use with the present invention. The library 10 includes a number of individual storage bins 12 for shelving individual memory devices or media therefor, such as hard disk drives, optical disk drives, and flash memory modules (hereinafter "devices"). Preferably, the memory devices are hard disk drives; however, the library may be adapted to for use with other computer memory devices, such as optical and tape media, and flash memory modules without departing from the principles of the invention. The bins 12 may also be used or particularly adapted for shelving cabling as described below.

The memory devices are typically accessed by a robotic picking apparatus 16 known as a "picker;" however the "picker" may be a human operator without departing from the principles of the invention. The library typically includes a controller which commands movements of the picker as described below, as well as carries out communications with one or more host computer(s) requesting access to the memory devices, such as described in the aforementioned companion application. The controller may be a general or special purpose computer.

The storage bins 12 are typically organized in a two-dimensional matrix, such as indicated by the coordinate system X–Z in FIG. 1. However, the storage bins may be organized into multiple two dimensional matrices, one or more linear arrays or one or more three-dimensional matrices as well, wherein a matrix may be any geometric shape such as but not limited to a square or circle, or a cube, cylinder or sphere. The picker is adapted to travel the extent of the dimensions required to visit any selected storage bin. The matrix shown is square to minimize the maximum distances the picker must travel.

In the prior art, the picker visits a selected storage bin in order to retrieve the memory device shelved there, brings it to a destination or library backplane which is electrically connected to a host computer, and installs the memory device into the backplane. When the host computer is finished with one memory device and requests access to another, the picker removes the first memory device from the destination backplane, travels to the storage bin shelving the second memory device, withdraws the second memory device from the storage bin and replaces it with the first memory device, and returns to the destination backplane to install the second memory device.

By contrast, according to the invention, some of the storage bins 12 are employed for storing I/O and power cables 18 (hereinafter "cables") necessary to mechanically and electrically connect a selected one of the memory devices 14 with the destination backplane to permit data communications therebetween. The cables 18 have connecting ends that include standard connectors for this purpose. Preferably, the cables include metal wires for transmitting data to gain the advantage of mechanical durability and robustness, though the wires are preferably used to transmit data using according to a fibre channel architecture.

In the typical library environment, there will be a substantially greater number of storage bins devoted to shelving memory devices than are needed to shelve cables. A relatively small subset of the storage bins 12 are therefore selected for cable storage and, according to a first aspect of the invention, are preferably disposed at or near the center of the matrix. For example, in FIG. 1 a middle row in the matrix is selected for storing cables 18 in preference to a top or bottom row.

The picker is adapted to grip a connecting end 20 of the cables 18, mechanically connect the connecting end to selected memory devices, and mechanically disconnect the connecting end from the memory device. Mechanisms for satisfying this purpose will be apparent to persons of ordinary skill in the art and need not be described.

Figure 2:
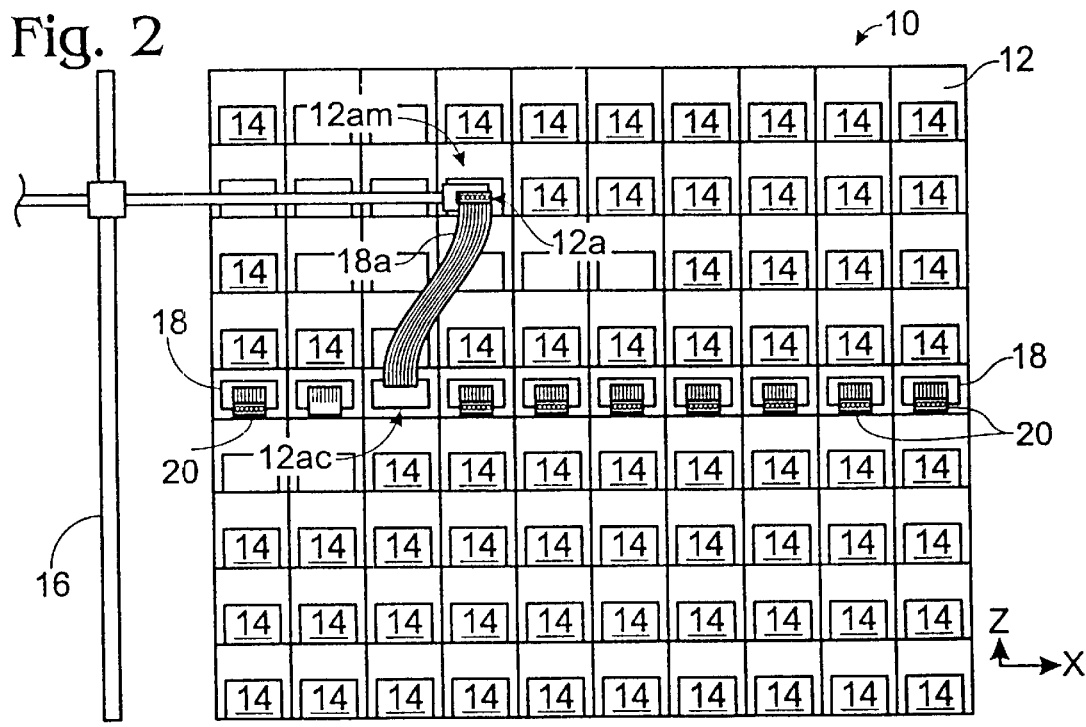
FIG. 2 is a pictorial schematic illustrating a first embodiment of a method for using a cabling picker according to the present invention.

Referring to FIG. 2, in a first embodiment of the invention, each cable is adapted to reach from the storage bin in which it resides to the storage bin that is the farthest distance away. When a host computer to which a cable 18a is connected requests data resident in a memory device that is shelved in a particular storage bin 12am, the picker 16 travels to the storage bin 12ac shelving the cable 18a, grabs the end 20a of the cable, travels to the storage bin 12am with the end of the cable, and connects the end of the cable to the memory device. The cables are preferably retractably stored on the storage bins, such as by use of spring loaded reels, or concentrically coiled springs, so that they will return to their respective storage bins when disconnected at the memory device by the picker.

In a second embodiment of the invention, the picker 16 anticipates that the cable 18a will be connected to a memory device in the future and carries the end 20a of the cable 18a with it during its rounds so that it is "ready" to move to a requested memory device without first visiting the storage bin 12ac shelving the cable. The decision to keep the cable 18a ready may be based, e.g., on the frequency of past requests for data by a particular computer.

Figure 3:
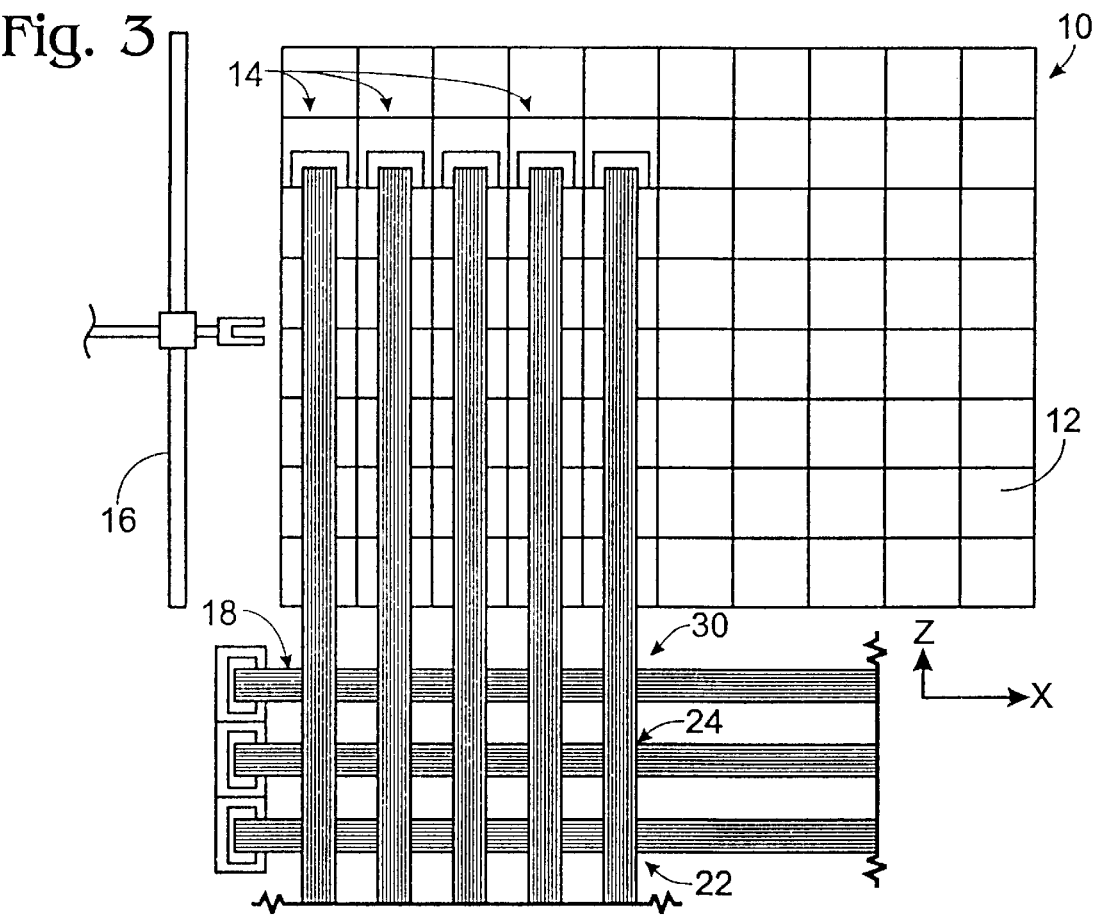
FIG. 3 is a pictorial schematic illustrating another embodiment of a method for using a cabling picker according to the present invention.

Turning to FIG. 3, in a third embodiment of the invention, a switching matrix 30 may be provided wherein the cables 18 are arranged in rows (or columns) and additional memory device cables 22 connected to the memory devices are arranged in columns (or rows). The columns define a first plane and the rows define a second plane that is spaced from the first plane, for normally preventing electrical contact at the points or potential "nodes" 24 corresponding to a it crossing of the cables 18 and the cables 22. However, at each node the cables 18 and 22 may be provided with an electrical switch which may be toggled by the picker to complete an electrical interconnection between a selected cable and memory device. As an alternative, each node may include a connector pair that can be mechanically connected and disconnected by the picker. As another alternative, a jumper cable may be used to jumper between a selected cable 18 and a selected cable 22, either at the node 24 or at some other locations of these cables. Where jumper cables are used, there may be no need to organize the cables 18 and 22 so that they cross as aforedescribed, depending on the length of the jumper cables. In that regard, it may be noted for conceptual purposes that if the length of the jumper cables is lengthened to become comparable to the length of the cables 22, the cables 22 may be replaced with the jumper cables wherein the alternative essentially degenerates to become the first embodiment described above.

The present invention provides a substantial increase in speed for at least two reasons. One of these is that the picker may be moved about the library more quickly. The cables 18 are less massive than the memory devices themselves, and the picker itself may be constructed to be less massive because of the reduction in the mass of its load. Another reason that the invention provides an increase in speed is that the distance the picker must travel is at least potentially reduced.

Figure 4:
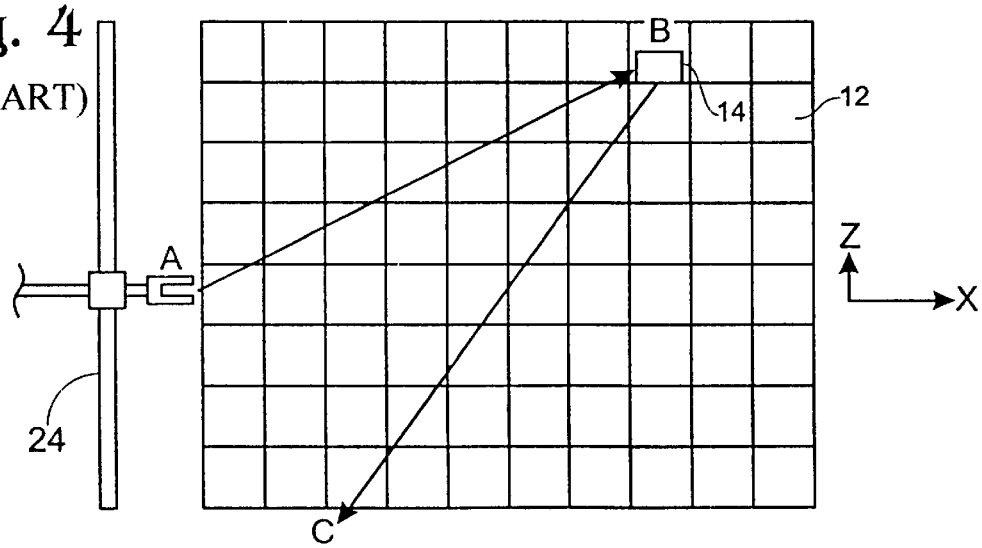
FIG. 4 is a pictorial schematic illustrating a prior art distance of travel for a prior art picker in a library of memory devices.

FIG. 4 shows the distance a prior art picker 24 must travel to process a typical request for data resident in a particular disk drive. The picker 24, starting at an arbitrary location A, was required to move to the location B for the memory device, and then move to the location C of the destination, wherein movements in the Y axis are ignored for simplicity. The total distance traveled is the distance from A to B, plus the distance from B to C. Both of these distances are, on average, the same, and are related to the dimensional extent of the matrix, assuming that the requests for data are distributed randomly over the storage bins 12.

Turning to FIG. 5, by contrast, the picker 16 according to the present invention may move from the arbitrary location A to a location D for a cable connected to the destination C, and then on to the location B for the memory device. The total distance traveled is the distance from A to D, plus the distance from D to B. This total distance may be on average less than the total distance A to B plus the distance B to C shown in FIG. 4 because the cables may be grouped in a dimensionally small subset of the space devoted to the memory devices and may be strategically positioned near or at the middle of the matrix.

According to the second embodiment of the invention, the picker moves from the arbitrary location A directly to the location B of the memory device, providing a further decrease in distance traveled by the picker. According to the third embodiment of the invention, the picker moves from the arbitrary location A directly to the node corresponding to the desired interconnection. Since the area devoted to the nodes may be substantially less than the area devoted to the memory devices themselves, this provides a still further decrease in the distance that the picker is required to travel.

Turning to FIG. 6, yet another embodiment of the invention is illustrated. It is recognized that there is typically a much larger number of memory devices in the library than host computers accessing the memory devices. According to the invention, the cables 18 may therefore be provided advantageously around the perimeter of a matrix 40 of the storage bins 12. Moreover, multiple copies of the cables 18 provided around corresponding multiple sides of the matrix may be bussed together and connected to respective hosts. For example, shown in FIG. 6 is a bus 42 that connects, e.g., four cables 18a, 18b, 18c, and 18d to a host computer #1. Similarly, a bus is provided to connect, e.g., four cables respectively to host computer #'s 2–5.

To illustrate the principle of this aspect of the invention further, suppose it is desired to connect the following host computers to the memory devices in the following storage bins: computer #1 with storage bin E; computer #2 with storage bin F, computer #3 with storage bin G, computer #4 with storage bin H, and computer #5 with storage bin J. It may be appreciated that, in general, there is a likelihood that at least some of the cables will cross one another. Such crossings have the potential for reducing speed. For example, to disconnect a first cable from one memory device and return the cable or the end of the cable to its storage bin, it may be necessary to wait until a second cable which crosses the first cable is put away or moved to avoid creating a knot.

More particularly, in FIG. 6 five cables 18a1, 18a2, 18a3, 18a4 and 18a5 are provided on the left hand side of the matrix 40. Each cable is connected to a respective host computer 1–5. If cable 18a5 is connected to the memory device at the storage bin J, it will cross the cable 18a4 which is connected to the memory device at the storage bin H. However, connecting cable 18c5 on the right hand side of the matrix 40 to the memory device at storage bin J eliminates the cross-over.

As many instances "n" of cables 18nh (for "h" host computers) may be provided as desired, wherein a larger value of n provides a greater likelihood that random connections between the host computers and the memory devices distributed throughout the library can be made without cross-overs.

The picker may respond to a computation of the shortest connection path available between cables 18nh for a given host computer $h_1$, e.g., $18n_1h_1$. Alternatively, the picker may respond to a modified decision not to select this shortest path as a result of determining that a cross-over with another cable will be produced thereby. The picker may then employ another path using another cable $18n_2h_1$ that, though it increases the distance the picker must travel, also increases the likelihood that maximum speed for the system as a whole is achieved by avoiding potential entanglements with other cables. Moreover, the decision regarding which path to take may be informed by the frequency of past requests for particular data by particular computers.

While applicable to memory devices generally, the present invention provides particular advantage for accessing mechanical media such as hard disk drives, because these are relatively heavy and therefore must be moved relatively slowly. Moreover, in accord with the invention, power may be provided at each of the storage bins 12 rather than with the I/O cabling moved by the picker, and the disk drives may be spun up during the time the picker is traveling thereto, still further reducing access time.

It is to be recognized that, while a particular cabling picker in a library of stationary disk drives has been shown and described as preferred, other configurations and methods could be utilized, in addition to those already mentioned, without departing from the principles of the invention.

The terms and expressions which have been employed in the foregoing specification are used therein as terms of description and not of limitation, and there is no intention of the use of such terms and expressions of excluding equivalents of the features shown and described or portions thereof, it being recognized that the scope of the invention is defined and limited only by the claims which follow.

What is claimed is:

1. A method for interconnecting one or more host computers and one or more memory devices shelved in corresponding storage bins in a library of the memory devices, the method comprising:

providing a robotic picker adapted for translation within the library so as to permit said picker to move to any selected one of the storage bins therein, the picker being disposed at an initial location in the library;

receiving a request for accessing a first memory device by a host computer through a destination in the library that is interconnected with the computer;

providing a first cable having a first and electrically interconnected with the first destination and a second end;

translating said picker from said initial location to a storage bin shelving the memory device;

employing said picker to connect said second end of said cable to the memory device; and accessing the memory device by the computer through said cable without moving the memory device substantially from the first storage bin.

2. The method of claim 1, further comprising providing the destination with a connector, and connecting said first end of said cable to said connector.

3. The method of claim 2, further comprising connecting said first end of said cable to the destination prior to said step of translating the picker from said initial location.

4. The method of claim 1, further comprising translating the picker from said initial location to a first cable storage location providing access to said second end of said cable, and picking said second end by use of the picker therefrom after said step of receiving said request.

5. The method of claim 1, further comprising translating the picker from said initial location to a first cable storage location providing access to said second end of said cable, and picking said second end by use of the picker therefrom prior to said step of receiving said request, for ensuring that the picker is "ready" for said step of receiving said request.

6. The method of claim 1, further comprising providing a retracting mechanism for retracting said second end of said cable toward said first end, receiving an acknowledgment from the computer that the computer no longer seeks to access the memory device, disconnecting said second end of said cable from the memory device by use of the picker and releasing said second end so that said retracting mechanism retracts said cable back to said cable storage location.

7. The method of claim 6, wherein said cable storage location is a storage bin in the library.

8. The method of claim 7, wherein said storage bin is proximate the center of the library.

9. The method of claim 1, further comprising providing a plurality of additional cables including a second cable having a first end electrically interconnected with the destination and a second end, and choosing between taking either an action (a) to connect said second end of said first cable to the memory device, or an action (b) to connect said second end of said second cable to the memory device, as a result of determining which of the actions (a) or (b) decreases the likelihood that some or all of said plurality of cables will cross one another, and taking the chosen said action.

10. The method of claim 9, wherein the library includes respective spaced apart storage locations for said first and second cables proximate the perimeter of the library, and storing said second end of said first cable and said second end of said second cable, when neither are connected to any memory device, respectively at said spaced apart locations.

11. An apparatus for interconnecting one or more host computers and one or more memory devices shelved in corresponding storage bins in a library of the memory devices, the apparatus comprising:

a robotic picker adapted for translation within the library so as to permit said picker to move to any selected one of the storage bins therein, the picker being disposed at an initial location in the library;

a controller for controlling said picker and for communicating with the one or more computers, said controller being adapted for receiving a request for accessing a memory device by a host computer through a destination in the library that is interconnected with the computer; and a first cable having a first end electrically interconnected with the destination and a second end, said controller being further adapted for commanding said picker to translate from said initial location to a storage bin shelving the memory device and connect said second end of said cable thereto, to provide access to the memory device by the computer through said cable without moving the memory device substantially from the storage bin.

12. The apparatus of claim 11, further comprising a connector electrically coupled to the destination, wherein said first end of said cable is adapted for interconnection with said connector.

13. The apparatus of claim 12, wherein said controller is adapted for commanding said picker to connect said first end of said cable to the destination prior to translating from said initial location.

14. The apparatus of claim 11, wherein said controller is adapted for commanding said picker, after receiving said request, to translate from said initial location to a first cable storage location providing access to said second end of said cable, and pick said second end from said location.

15. The apparatus of claim 11, wherein said controller is adapted for commanding said picker, prior to receiving said request, to translate from said initial location to a first cable storage location providing access to said second end of said cable, and pick said second end from said location, to ensure that the picker is "ready" for acting on said request.

16. The apparatus of claim 11, further comprising a retracting mechanism for retracting said second end of said cable toward said first end, wherein said controller is adapted for receiving an acknowledgment from the computer that the computer no longer seeks to access the memory device, and commanding said picker to disconnect said second end of said cable from the memory device and release said second end so that said retracting mechanism retracts said cable back to said cable storage location.

17. The apparatus of claim 16, wherein said cable storage location is a storage bin in the library.

18. The apparatus of claim 17, wherein said storage bin is proximate the center of the library.

19. The apparatus of claim 11, further comprising a plurality of additional cables including a second cable having a first end electrically interconnected with the destination and a second end, wherein said controller is adapted for choosing between commanding said picker to take either an action (a) to connect said second end of said first cable to the memory device, or an action (b) to connect said second end of said second cable to the memory device, as a result of determining which of the actions (a) or (b) decreases the likelihood that some or all of said plurality of cables will cross one another, and commanding said picker to take the chosen said action.

20. The apparatus of claim 19, wherein the library includes respective spaced apart storage locations for said first and second cables proximate the perimeter of the library, and wherein said controller is adapted for commanding said picker to store said second end of said first cable and said second end of said second cable, when neither are connected to any memory device, respectively at said spaced apart locations.

21. A method for interconnecting one or more host computers with selected memory devices in a library of memory devices wherein the memory devices are shelved in storage bins therein, the method comprising:

providing a picker adapted for translation within the library, the picker being disposed at an initial location in the library;

receiving a request for accessing a memory device by a computer through a destination, the memory device being shelved in a predetermined storage bin;

providing a first cable electrically connected to the memory device;

providing a second cable electrically connected to the destination, wherein said first and second cables define a node for electrically coupling therebetween;

translating the picker to said node and electrically coupling said first and said second cables at said node by use of the picker, for interconnecting the memory device and the computer; and accessing the memory device by the computer through said first and second cables without moving the memory device substantially from the storage bin.

22. The method of claim 21, wherein said step of coupling said first and said second cables at said node includes providing a jumper cable and jumping between said first and said second cables with said jumper cable by use of said picker.

23. The method of claim 21, further comprising crossing said first and said second cables while providing a spacing therebetween at said node, wherein said step of coupling said first and second cables includes moving said first and second cables toward one another at said node by use of said picker to make electrical contact therebetween.

24. The method of claim 21, further comprising providing a first connector electrically connected to said first cable at said node and a complementary second connector electrically connected to said second cable at said node, wherein said step of coupling said first and second cables at said node includes connecting said first and second connectors.

25. An apparatus for interconnecting one or more host computers with selected memory devices in a library of memory devices wherein the memory devices are shelved in storage bins therein, the apparatus comprising:
   a picker adapted for translation within the library, the picker being disposed at an initial location in the library;
   a controller for controlling said picker and for communicating with the one or more computers, said controller being adapted for receiving a request for accessing a memory device by a host computer through a destination in the library that is interconnected with the computer, the memory device being shelved in a predetermined storage bin;
   a first cable electrically connected to the memory device;
   a second cable electrically connected to the destination, wherein said first and second cables define a node for electrically coupling therebetween, wherein said controller is adapted for commanding said picker to translate to said node and electrically couple said first and said second cables at said node, for interconnecting the memory device and the computer, to provide access to the memory device by the computer through said cable without moving the memory device substantially from the storage bin.

26. The apparatus of claim 25, further comprising a jumper cable, wherein said controller is adapted to command said picker to jumper between said first and said second cables.

27. The apparatus of claim 25, wherein said first and said second cables are disposed cross-wise with respect to and spaced apart from each other to provide a spacing therebetween at said node, wherein said controller is adapted to command said picker to move said first and second cables toward one another at said node so as to make electrical contact therebetween.

28. The apparatus of claim 25, further comprising a first connector electrically connected to said first cable at said node and a complementary second connector electrically connected to said second cable at said node, wherein said controller is adapted to command said picker to connect said first and second connectors to make electrical contact therebetween.

29. A library of memory devices for use by one or more host computers communicating with the library, comprising:
   a plurality of storage bins, each bin adapted to receive a corresponding one of the memory elements;
   a picker adapted for translation within the library, the picker being disposed at an initial location in the library;
   a controller for controlling said picker and for communicating with the one or more computers, said controller being adapted for receiving a request for accessing a memory device by a host computer through a destination in the library that is interconnected with the computer, the memory device being shelved in a predetermined one of said storage bins; and
   a cable having a first end electrically interconnected with the first destination and a second end, wherein said controller is adapted to command said picker to translate from said initial location to the storage bin corresponding to the memory device and connect said second end of said cable to the memory device, to provide access to the memory device by the computer through said cable without moving the memory device substantially from the storage bin.

30. The library of claim 29, further comprising a connector electrically coupled to the destination, wherein said first end of said cable is adapted for interconnection with said connector.

31. The library of claim 30, wherein said controller is adapted for commanding said picker to connect said first end of said cable to the destination prior to translating from said initial location.

32. The library of claim 29, wherein said controller is adapted for commanding said picker, after receiving said request, to translate from said initial location to a first cable storage location providing access to said second end of said cable, and pick said second end from said location.

33. The library of claim 29, wherein said controller is adapted for commanding said picker, prior to receiving said request, to translate from said initial location to a first cable storage location providing access to said second end of said cable, and pick said second end from said location, to ensure that the picker is "ready" for acting on said request.

34. The library of claim 29, further comprising a retracting mechanism for retracting said second end of said cable toward said first end, wherein said controller is adapted for receiving an acknowledgment from the computer that the computer no longer seeks to access the memory device, and commanding said picker to disconnect said second end of said cable from the memory device and release said second end so that said retracting mechanism retracts said cable back to said cable storage location.

35. The library of claim 34, wherein said cable storage location is one of said storage bins.

36. The library of claim 35, wherein said storage bin is proximate the center of the library.

37. The library of claim 29, further comprising a plurality of additional cables including a second cable having a first end electrically interconnected with the destination and a second end, wherein said controller is adapted for choosing between commanding said picker to take either an action (a) to connect said second end of said first cable to the memory device, or an action (b) to connect said second end of said second cable to the memory device, as a result of determining which of the actions (a) or (b) decreases the likelihood that some or all of said plurality of cables will cross one another, and commanding said picker to take the chosen said action.

38. The library of claim 37, wherein the library includes respective spaced apart storage locations for said first and second cables proximate the perimeter of the library, and wherein said controller is adapted for commanding said picker to store said second end of said first cable and said second end of said second cable, when neither are connected to any memory device, respectively at said spaced apart locations.

39. A library of memory devices for use by one or more host computers communicating with the library, comprising:
   a plurality of storage bins, each bin adapted to receive a corresponding one of the memory elements;
   a picker adapted for translation within the library, the picker being disposed at an initial location in the library;
   a controller for controlling said picker and for communicating with the one or more computers, said controller being adapted for receiving a request for accessing a memory device by a host computer through a destination in the library that is interconnected with the computer, the memory device being shelved in a predetermined one of said storage bins;

a first cable electrically connected to the memory device;

a second cable electrically connected to the destination, wherein said first and second cables define a node for electrically coupling therebetween, wherein said controller is adapted for commanding said picker to translate to said node and electrically couple said first and said second cables at said node, for interconnecting the memory device and the computer, to provide access to the memory device by the computer through said cable without moving the memory device substantially from the storage bin.

40. The library of claim 39, further comprising a jumper cable, wherein said controller is adapted to command said picker to jumper between said first and said second cables.

41. The library of claim 39, wherein said first and said second cables are disposed cross-wise with respect to and spaced apart from each other to provide a spacing therebetween at said node, wherein said controller is adapted to command said picker to move said first and second cables toward one another at said node so as to make electrical contact therebetween.

42. The library of claim 39, further comprising a first connector electrically connected to said first cable at said node and a complementary second connector electrically connected to said second cable at said node, wherein said controller is adapted to command said picker to connect said first and second connectors to make electrical contact therebetween.

* * * * *

UNITED STATES PATENT AND TRADEMARK OFFICE
CERTIFICATE OF CORRECTION

PATENT NO.   : 6,512,962 B2
DATED        : January 28, 2003
INVENTOR(S)  : Kamal Dimitri et al.

It is certified that error appears in the above-identified patent and that said Letters Patent is hereby corrected as shown below:

<u>Column 6,</u>
Line 32, replace the word "and" with -- end --.

<u>Column 8,</u>
Line 55, replace the word "jumping" with -- jumpering --.

Signed and Sealed this

Twenty-fifth Day of March, 2003

JAMES E. ROGAN
*Director of the United States Patent and Trademark Office*